(12) United States Patent
Blomberg et al.

(10) Patent No.: US 11,194,152 B2
(45) Date of Patent: Dec. 7, 2021

(54) ELECTRICALLY TUNABLE FABRY-PEROT INTERFEROMETER, AN INTERMEDIATE PRODUCT AN ELECTRODE ARRANGEMENT AND A METHOD FOR PRODUCING AN ELECTRICALLY TUNABLE FABRY-PEROT INTERFEROMETER

(71) Applicant: TEKNOLOGIAN TUTKIMUSKESKUS VTT, Espoo (FI)

(72) Inventors: Martti Blomberg, Espoo (FI); Hannu Kattelus, Vantaa (FI); Riikka Puurunen, Espoo (FI)

(73) Assignee: TEKNOLOGIAN TUTKIMUSKESKUS VTT, Espoo (FI)

( * ) Notice: Subject to any disclaimer, the term of this patent is extended or adjusted under 35 U.S.C. 154(b) by 0 days.

(21) Appl. No.: 16/525,213

(22) Filed: Jul. 29, 2019

(65) Prior Publication Data

US 2020/0026063 A1 Jan. 23, 2020

Related U.S. Application Data

(63) Continuation of application No. 13/146,319, filed as application No. PCT/FI2010/050043 on Jan. 27, 2010, now abandoned.

(30) Foreign Application Priority Data

Jan. 27, 2009 (FI) .................................. 20095068

(51) Int. Cl.
G02B 26/00 (2006.01)

(52) U.S. Cl.
CPC .................. *G02B 26/00* (2013.01)

(58) Field of Classification Search
CPC .. G02B 26/00; G02B 26/001; G02B 6/29395; G01B 9/02; G01J 3/26
USPC ............... 359/578, 579; 356/451, 454, 519; 427/58; 372/20, 43.01; 257/432; 438/106–127
See application file for complete search history.

(56) References Cited

U.S. PATENT DOCUMENTS 5,622,900 A 4/1997 Smith
6,078,395 A 6/2000 Jourdain et al.
(Continued)

OTHER PUBLICATIONS

Tran et al.: Surface micromachined Fabry-Perot tunable filter IEEE Photonics Technology Letter, Mar. 1996, vol. 8, Issue 3, pp. 393-395, pp. 393-394; fig. 2., Cited in ISR.
(Continued)

*Primary Examiner* — Marin Pichler
(74) *Attorney, Agent, or Firm* — Nixon & Vanderhye

(57) ABSTRACT

Electrically tunable Fabry-Perot interferometers which are produced with micromechanical (MEMS) technology. Producing interferometers with prior art processes includes costly and complicated production phases. Therefore, it has not been possible to apply interferometers in consumer mass products. According to the present solution, the Fabry-Perot cavity is made by removing a sacrificial layer (112) which has been polymer material. A mirror layer (113, 117-120) which is produced above the sacrificial layer can be made with atomic layer deposition technology, for example. According to a preferable embodiment, electrodes (106*b*, 115*b*) of the mirror structures are formed by using sputtering or evaporation. With the present solution it is possible to avoid the above mentioned problems related with prior art.

14 Claims, 4 Drawing Sheets

(56) References Cited

U.S. PATENT DOCUMENTS

| | | |
|---|---|---|
| 6,381,022 B1 | 4/2002 | Zavracky |
| 6,438,149 B1 | 8/2002 | Tayebati et al. |
| 6,630,657 B1 | 10/2003 | Seppa et al. |
| 6,712,480 B1 | 3/2004 | Leung et al. |
| 2003/0012231 A1 | 1/2003 | Tayebati et al. |
| 2003/0031221 A1 | 2/2003 | Wang et al. |
| 2003/0009107 A1 | 5/2003 | Wang et al. |
| 2003/0091072 A1 | 5/2003 | Wang et al. |
| 2005/0001731 A1 | 1/2005 | Wan |
| 2005/0017177 A1 | 1/2005 | Tai et al. |
| 2005/0017313 A1 | 1/2005 | Wan |
| 2005/0094964 A1 | 5/2005 | Sato |
| 2007/0006429 A1 | 3/2007 | Faase et al. |
| 2007/0064295 A1 | 3/2007 | Faase et al. |
| 2007/0155051 A1 | 7/2007 | Wang et al. |
| 2007/0211257 A1 | 9/2007 | Kearl et al. |
| 2007/0024235 A1 | 10/2007 | Lin et al. |
| 2007/0242341 A1 | 10/2007 | Natarajan et al. |
| 2007/0242358 A1 | 10/2007 | Lin et al. |
| 2008/0310008 A1 | 12/2008 | Chan |

OTHER PUBLICATIONS

Zuo et al.: Fabrication of 1.3 μm Si-based MEMS tunable optical filter. In Proceedings of SPIE MEMS/MOEMS Technologies and Applications Conference. 2002, vol. 4928, pp. 73-76; pp. 73-74; fig. 1., Cited in ISR.

Antoszewski, et al.: Materials and Processes for MEMS-based infrared microspectrometer integrated on HgCdTe detector. IEEE Journal of Selected Topics in Quantum Electronics, Jul./Aug. 2008, vol. 14, Issue 4, pp. 1031-1041; pp. 1031-1038; fig. 2, Cited in ISR.

Yang H. Design and fabrication of a tunable Fabry-Perot interferometer/photodiode micro-spectral image sensor. Dissertation, University of Notre Dame, Indiana. Dec. 2007, pp. 1-12, 33-70; pp. 1-12, 33-70; figs. 1.2, 3.12,1.13, 3.21, Cited in ISR.

Ruf et al. A miniaturised Fabry Perot AFM sensor. In Proceedings of the 8th International Conference on Solid-state Sensors and Actuators and Eurosensors IX. 1995, pp. 660-663, (current version published Jun. 8, 2002), entire document. Cited in ISR.

Finnish Search Report, dated Nov. 20, 2009, from corresponding Finnish application.

International Search Report, dated May 5, 2010, from corresponding PCT application.

Antonszewski et al. "Materials and Processes for MEMS-Based Infrared Microspectrometer Integrated on HgCdTe Detector," Jul. 8, 2008, IEEE, J. Selected Topics in Quantum Electronics, 14, 1031-1040.

S. M. Sze, "VLSI Technology," 1988, 2nd Edition, pp. 656-657.

Supplemental European Search report dated Nov. 22, 2017, in corresponding European Application 10735510.9.

Tran A. T. T. D et al.: "Surface micromachined Fabry-Perot tunable filter", IEEE Photonics Technology Letters, IEEE Service Center, Piscataway, NJ, US, vol. 8, No. 3, Mar. 1, 1996 (Mar. 1, 1996), pp. 393-395, XP011430942, ISSN: 1041-1135, DOI: 10.1109/68.481128.

Finnish Office Action No. 20095068 dated Mar. 13, 2015.

ELECTRICALLY TUNABLE FABRY-PEROT INTERFEROMETER, AN INTERMEDIATE PRODUCT AN ELECTRODE ARRANGEMENT AND A METHOD FOR PRODUCING AN ELECTRICALLY TUNABLE FABRY-PEROT INTERFEROMETER

TECHNICAL FIELD

The invention relates to a method for producing an electrically tunable Fabry-Perot interferometer, an electrically tunable Fabry-Perot interferometer, an intermediate product, and an electrode arrangement. More specifically, the invention relates to electrically tunable Fabry-Perot interferometers which are produced with micromechanical (MEMS) technology. The technical field of the invention is specified in the preamble of the independent claims.

BACKGROUND TECHNOLOGY

Fabry-Perot interferometers are used as optical filters and in spectroscopic sensors, for example. The Fabry-Perot interferometer is based on parallel mirrors, whereby a Fabry-Perot cavity is formed into a gap between the mirrors. The pass band wavelength of a Fabry-Perot interferometer can be controlled by adjusting the distance between the mirrors i.e. the width of the gap. The tuning is usually made electrically. It is common to use micromechanical technology for producing electrically tunable Fabry-Perot interferometers. Such a solution is described e.g. in patent document F195838. Prior art structure of a micromechanical interferometer usually includes layers of silicon, wherein electrically conductive layers and reflective layers are doped. A movable mirror is provided by removing a sacrificial layer of silicon dioxide, which layer has initially been formed between two mirror layers. The position of a movable mirror is controlled by applying voltage to electrodes, which are included in the mirror structures.

The micromechanical production technology allows series production of interferometers. However, there are some disadvantages related with the prior art solutions for production of interferometers and the interferometer components.

The doping of the silicon layers requires the use of an ion doping facility, which is expensive equipment and thus increases the production cost. Another problem relates to removing the sacrificial layer between the mirrors. In prior art processes the removal is a separate process which must be made before the interferometers can be cut from the wafers, and encapsulated. Such a separate process increases the complicity of the production process. Also, the cutting, encapsulating and transportation of the interferometers require special handling because of the movable, released mirror. A released mirror is sensitive to environmental stress, such as physical pressure, changes of temperature or humidity, contamination, etc.

Due to the relatively high production cost of interferometers, it has not been possible to use them in mass product applications where the cost requirements are strict.

A further disadvantage of the prior art technology relates to the inability to provide a gap with short distance between the mirrors. This is due to the wet etching process wherein providing narrow gaps is difficult. Also, when Fabry-Perot interferometers are produced for visible and ultraviolet light, the optical layers need to be thin. Thin membranes are often discontinuous and include pinholes. Such membranes easily become damaged during wet etching. Therefore the prior art technology is not suitable for producing electrically tunable Fabry-Perot interferometers for short wavelengths such as visible and ultraviolet range.

SUMMARY OF THE INVENTION

The purpose of the present invention is to avoid or reduce disadvantages of the prior art.

The object of the invention is achieved with a solution, in which polymer is used for providing a sacrificial layer between the mirrors of an electrically tunable Fabry-Perot interferometer. With this inventive solution it is possible to avoid the above mentioned problems related with prior art.

A mirror layer which is deposited after providing the sacrificial layer is usefully made in a process wherein the temperature of the sacrificial layer does not exceed the glass transition temperature of the polymer material. The glass transition temperature of a polymer material is a temperature value, above which the structure of the polymer material becomes unstable and deformations of the structure generally occur.

An example of a useful process for depositing the mirror layer is atomic layer deposition (ALD) technology, wherein the applied temperature is below the glass transition temperature of the polymer sacrificial layer. According to a preferable embodiment, electrodes of the mirrors are formed by using sputtering or evaporation of suitable metal, such as aluminium, copper, gold or platinum.

A method according to the invention for producing an electrically tunable Fabry-Perot interferometer, wherein
a substrate is provided,
a first mirror structure is provided on the substrate,
a second, movable mirror structure is provided, whereby the first and second mirror structures comprise first and second mirrors which are substantially parallel,
a Fabry-Perot cavity is provided between the first and second mirrors, whereby providing the cavity comprises providing a sacrificial layer between the first and second mirror structures before providing the second mirror structure, and the sacrificial layer is removed after providing the second mirror structure,
providing electrodes for electrical control of the distance between the mirrors, is characterised in that polymer material is applied as the sacrificial layer.

Electrically tunable Fabry-Perot interferometer according to the invention, comprising
a substrate,
a first mirror structure on the substrate,
a second, movable mirror structure, whereby the first and second mirror structures comprise first and second mirrors which are substantially parallel,
a Fabry-Perot cavity between the first and second mirrors, whereby the cavity has been formed by providing a sacrificial layer on the first mirror structure, and at least partially removing the sacrificial layer after providing the second mirror structure,
electrodes for electrical control of the distance between the mirrors, is characterised in that the cavity has been made with sacrificial layer comprising polymer material.

An intermediate product of an electrically tunable Fabry-Perot interferometer according to the invention, comprising
a substrate,
a first mirror structure on the substrate,
a second, movable mirror structure, whereby the first and second mirror structures comprise first and second mirrors which are substantially parallel, a sacrificial layer between the first and second mirror structures, electrodes for electrical control of the distance between the mirrors, is characterised in that the sacrificial layer includes polymer material.

A micromechanical component according to the invention, which component has a first part and a second part, in which component there is a first electrode in the first part and a second electrode in the second part, and wherein the distance between the first part and the second part is controlled by applying a voltage between the first and second electrodes, said first and second electrodes forming a first capacitance, is characterised in that there is a third electrode in the first part, wherein there is a second capacitance between the second and third electrodes, whereby the first and second capacitances are series connected, and the AC voltage applied between the first and third electrodes is adapted to form a control voltage across the first capacitance for controlling the distance between the first and second parts.

Some preferable embodiments of the invention are described in the dependent claims.

Significant advantages can be achieved with the invention when compared to the prior known solutions. The sacrificial layer can be removed with dry etching, and this can be performed after cutting the chips and also after encapsulating the chips. This allows simple cutting and packaging procedures because the movable mirror does not need to be released at that phase and is therefore not sensitive to environmental stress, such as physical pressure, changes of temperature or humidity, contamination, etc. Also, it is possible to transport the interferometers in normal transportation manners because the movable mirrors can be released after the transport.

Further, it is not necessary to use complicated and expensive ion doping equipment in the production. Thus it is possible to use a simpler component production line, whereby the production costs can be made sufficiently low for mass production. As a consequence, the interferometers according to the invention can be applied in new consumer applications where production quantities are large and production costs need to be minimal.

When the sacrificial layer is removed by dry etching with oxygen plasma, through holes of the movable mirror, it is possible to use a thin sacrificial layer. Thus it is possible to achieve a small gap between the mirrors, and to provide electrically tunable Fabry-Perot interferometers for short wave lengths. For example, it is possible to provide interferometers for ultraviolet range, which has not been possible with prior art technology.

In one preferable embodiment of the invention the second, movable mirror structure comprises at least one layer which has been deposited in an environment wherein the temperature of the sacrificial layer remains below the glass transition temperature of the polymer material.

In one embodiment of the invention the electrodes of the movable mirror structure are covered by electrically isolating or semi-insulating optical layer(s), which protects the electrodes and prevents electrical short circuits of the opposite electrodes. If electrically semi-insulating layer, such as $TiO_2$, is used for covering the electrode surface it will also prevent electrical charging phenomena at the surfaces of the electrodes. Charging of the optical layer may cause inaccuracy of the controlled mirror position.

In one aspect of the invention one of the electrodes is electrically floating. This allows the use of alternating voltage for the tuning of the interferometer, and it is not necessary to provide control conductors to one of the mirrors for controlling the gap between the mirrors. The production process of the interferometer is less complicated, and the structure is more reliable when it is not necessary to arrange electrical connections to all electrode layers. This floating electrode structure can be advantageous also in electrically tunable Fabry-Perot interferometers where other than polymer material is used as a sacrificial layer. The floating electrode structure can also be used in other components than interferometers, such as adjustable capacitors. The electrically floating electrode can be an electrode of a movable part or an electrode of a fixed part in the structure of a component. When the electrically floating electrode is located in the upper mirror of an interferometer, the number of lithography phases after applying the polymer layer can be minimized.

In one embodiment of the invention the mirror structures have further electrodes for capacitive measurement of the width of the gap between the mirrors. Such measurement information can be used as a feedback in controlling the interferometer.

According to one embodiment of the invention the interferometer is integrated with a radiation detector, whereby the detector can be formed into a silicon substrate of the interferometer. This allows the production of small-size, reliable and low-cost spectrometer. Low processing temperatures in the production of the interferometer allow the integration of the interferometer with various other structures/functionalities.

The interferometers according to the invention can be designed for the usage for any radiation within optical range; visible light, ultraviolet (UV) radiation, near infra-red radiation (NIR) and infrared radiation (IR). It is only necessary to choose materials for the substrate and the mirror structures which are transparent for the operating wavelength.

In this patent application the term "mirror" means a structure where there is a reflective layer.

In this patent application the terms "radiation" or "light" are used to mean any radiation in the optical range of wavelengths.

In this patent application "gap width" means the distance between the mirrors at the concerned position.

In this patent application "electrically floating" means that the concerned electrode is not electrically connected to any functional potential of the interferometer including ground potential.

In this patent application "sacrificial layer" means a material layer which is at least partially removed in the final product.

In this patent application "semi-insulating" means resistivity which has a value within the range $1*10^{-2} \ldots 1*10^6$ ohm metres.

SHORT DESCRIPTION OF THE DRAWINGS

In the following part the preferable exemplary embodiments of the invention are described in more detail by referring to the enclosed drawings, in which:

FIG. 1b illustrates cross sections of an exemplary electrically tunable Fabry-Perot interferometer according to the invention after completing exemplary production process phases of FIG. 1a;

FIG. 5b illustrates the equivalent circuit of the electrode structure of FIG. 5a.

DETAILED DESCRIPTION OF THE EMBODIMENTS

Figure 1A:
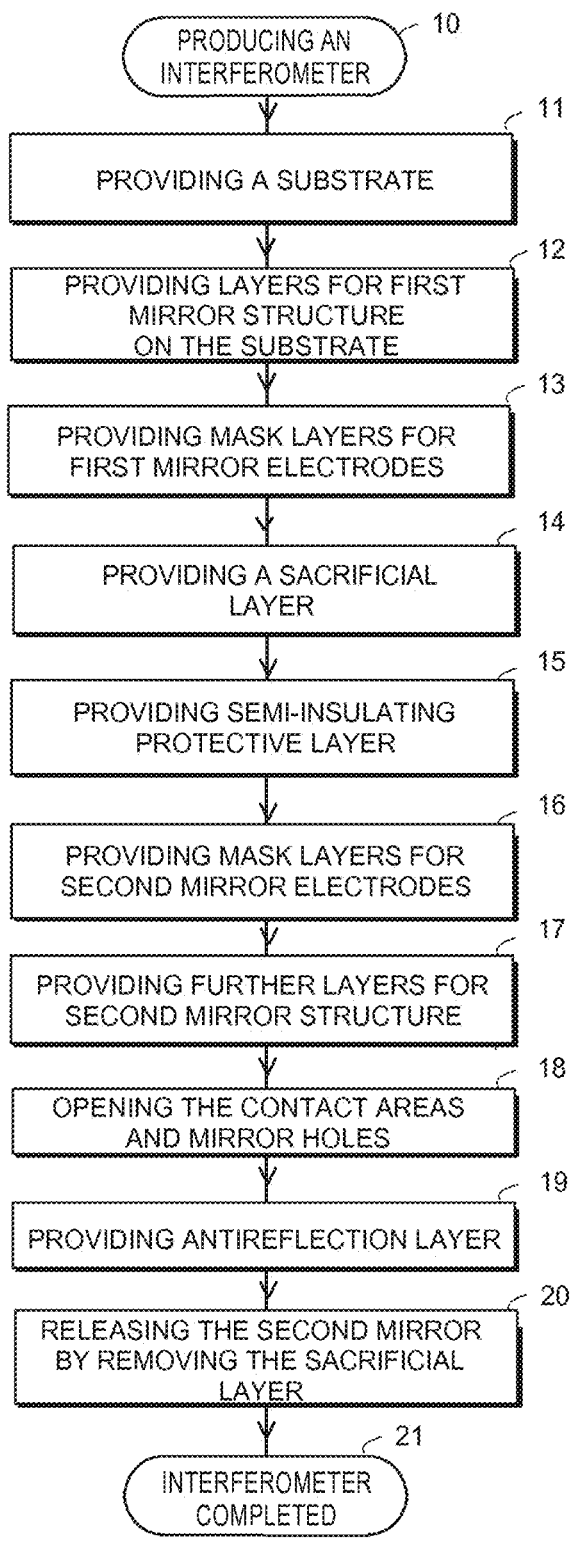
FIG. 1a illustrates a flow diagram of an exemplary process according to the invention for producing an electrically tunable Fabry-Perot interferometer.
Figure 1B:
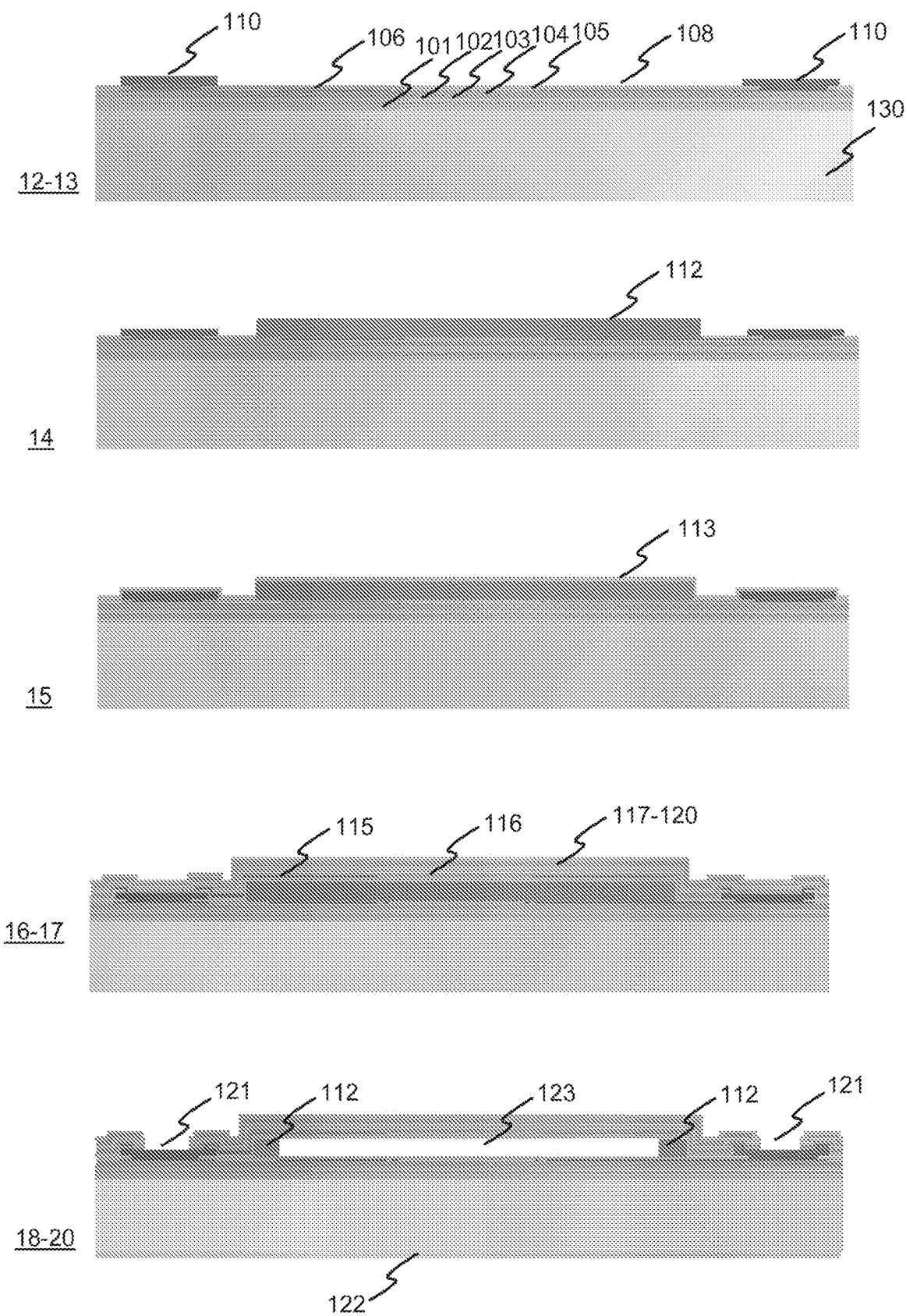

FIG. 1a illustrates a process diagram of an exemplary method according to the invention for producing an electrically tunable Fabry-Perot interferometer. FIG. 1b illustrates cross sections of the product after certain production phases of FIG. 1a.

The production process is started by providing a wafer 100 in phase 11. The wafer material can be e.g. fused silica. In the next phase 12 layers 101-105, 108 are formed for providing layers of the first, fixed mirror structure on the substrate. The first mirror structure can be produced by e.g. depositing successive layers of titanium dioxide $TiO_2$ and aluminium oxide $Al_2O_3$ on the substrate, phase 12. For example, there may be two layers of aluminium oxide 102, 104 between three layers of titanium dioxide 101, 103, 105. The thickness of the titanium dioxide layers can be e.g. 10 nm-2 µm, and the thickness of the aluminium oxide layers can be e.g. 10 nm-2 µm. The actual thickness of the layers depends on the materials and the range of wavelengths at which the interferometer needs to be functional. The thickness of the layers is typically a quarter or a half of the operating wavelength of the radiation within the material of the concerned layer. These layers can be deposited on the substrate by ALD process, for example. The temperature of the ALD process can be e.g. 100-300° C. However, since the sacrificial layer of polymer has not yet been provided at this stage, it is also possible to use alternative processes which utilize higher temperatures.

Next in phase 13 layers are provided for electrodes of the first mirror. A layer of aluminium, 106, is sputtered on the $TiO_2$ layer 105. The thickness of the Al layer is e.g. 10-100 nm. This layer of aluminium 106 will provide a first mask layer for electrode and electric wiring. The sputtered aluminium layer is patterned, and wet etched in order to remove the layer from the required locations outside the pattern. This way, electrode 106 of a required pattern is formed. An optical layer of $TiO_2$, 108, is then deposited above the Al layer by e.g. using ALD process. The thickness of this $TiO_2$ layer is e.g. 10 nm-2 µm. This is also a mask layer, which is patterned and wet etched to remove the layer in required locations 110 outside the pattern, i.e. from the locations of the electrode contact areas. Then a further layer of aluminium 110 is sputtered for providing contacts for the electrode. The thickness of the second Al layer is e.g. 100 nm-2 µm. The aluminium layer is patterned and etched to remove the aluminium from required locations outside the pattern, i.e. outside the electrode contact areas.

The topmost $TiO_2$ layer at the optical area of the first mirror is thus made of two optical layers 105, 108, and the electrode 106 is located between these two layers. This way a protective layer is provided on the electrode. $TiO_2$ layer is electrically slightly conducting, which prevents occurrence of charging phenomena at the surfaces of the electrodes. However, the electrical isolation of the $TiO_2$ layer is sufficient for providing the required isolation in the lateral direction.

In phase 14 a layer of sacrificial polymer, 112, is provided by spinning process, for example. This layer is also patterned as a mask layer, and the polymer is removed outside the pattern. The sacrificial layer will define the Fabry-Perot cavity. The sacrificial layer is polymer material, and thickness of the sacrificial layer is defined by the required distance between the mirrors of the interferometer.

In the next phases 15-17 layers for the second, movable mirror are formed. In phase 15 an optical layer of $TiO_2$, 113, is deposited on the sacrificial layer by using e.g. ALD process. This mask layer of $TiO_2$ is etched and patterned, whereby the $TiO_2$ layer is removed from the required locations 114 outside the pattern, at the area of the electrode contacts 110. This layer serves as an optical layer of the second mirror and as protecting layer for the electrode. This layer is preferably electrically semi-insulating, whereby it prevents the appearance of charging phenomena in the second mirror of the finished structure. It also prevents short-circuit of electrodes. The layer is uniform, and therefore it is possible to remove the resist used for patterning electrodes without damaging the sacrificial layer of polymer material.

A layer of aluminium 115 is sputtered to provide the electrode. The thickness of this aluminium layer is e.g. 10 nm-100 nm. The aluminium mask layer forms the electrode 115 of the upper, movable mirror of the interferometer. The aluminium layer is patterned and wet etched in order to remove the aluminium from required locations 116 outside the pattern.

In phase 17 further optical layers are formed for the second mirror. There can be e.g. four further optical layers, wherein the first and third layer is made of $Al_2O_3$, and the second and fourth layer is made of $TiO_2$. These optical layers can be deposited by using ALD process. The above ALD phases can be processed in a temperature of 100-300° C., for example. Other alternative deposition processes may also be used but the temperature of the deposition process must be low enough to avoid deformation of the sacrificial layer of polymer material. The thickness of the $TiO_2$ layer can be e.g. 10 nm-2 µm, and the thickness of the $Al_2O_3$ layer can be e.g. 10 nm-2 µm. The actual thickness of the layers depends on the materials and the range of wavelengths at which the interferometer needs to be functional.

The $Al_2O_3$ and $TiO_2$ layers produced in phases 15 and 17 form a mask layer which is patterned and etched in phase 18. By the etching, the optical layers are removed from above the electric contacts of the electrodes, 121. The patterning and etching can also be used for providing through-holes in the second mirror. These holes are needed for removing the sacrificial layer 112.

In phase 19 an antireflection layer of e.g. $MgF_2$, 122, is deposited on the surface of the silica wafer, which surface is opposite to the previously mentioned interferometer layers. Finally in phase 20 the chips are cut, and the sacrificial polymer is dry etched with $O_2$ plasma. The upper, second mirror structure has small-sized holes in order to allow the reactive species to penetrate through the mirror structure. When the sacrificial layer is removed from the optical area between the mirrors, the Fabry-Perot cavity 123 is formed. The Figure of phase 20 thus shows a completed interferometer chip. The interferometer chips are then encapsulated and the electrode wires may be bonded. It is also possible that the removal of the sacrificing layer takes place after the encapsulation. There are thus several phases in which the sacrificial layer can be removed: before the chip is cut out from the wafer; after the chip is cut from the wafer but before encapsulation of the chip; or after the encapsulation of the chip. When the sacrificial layer is not removed before cutting the chips from a wafer, it is possible to use normal cutting procedures since the second mirror is not sensitive to environmental stress, such as physical pressure, changes of temperature or humidity, contamination, etc.

Figure 2:
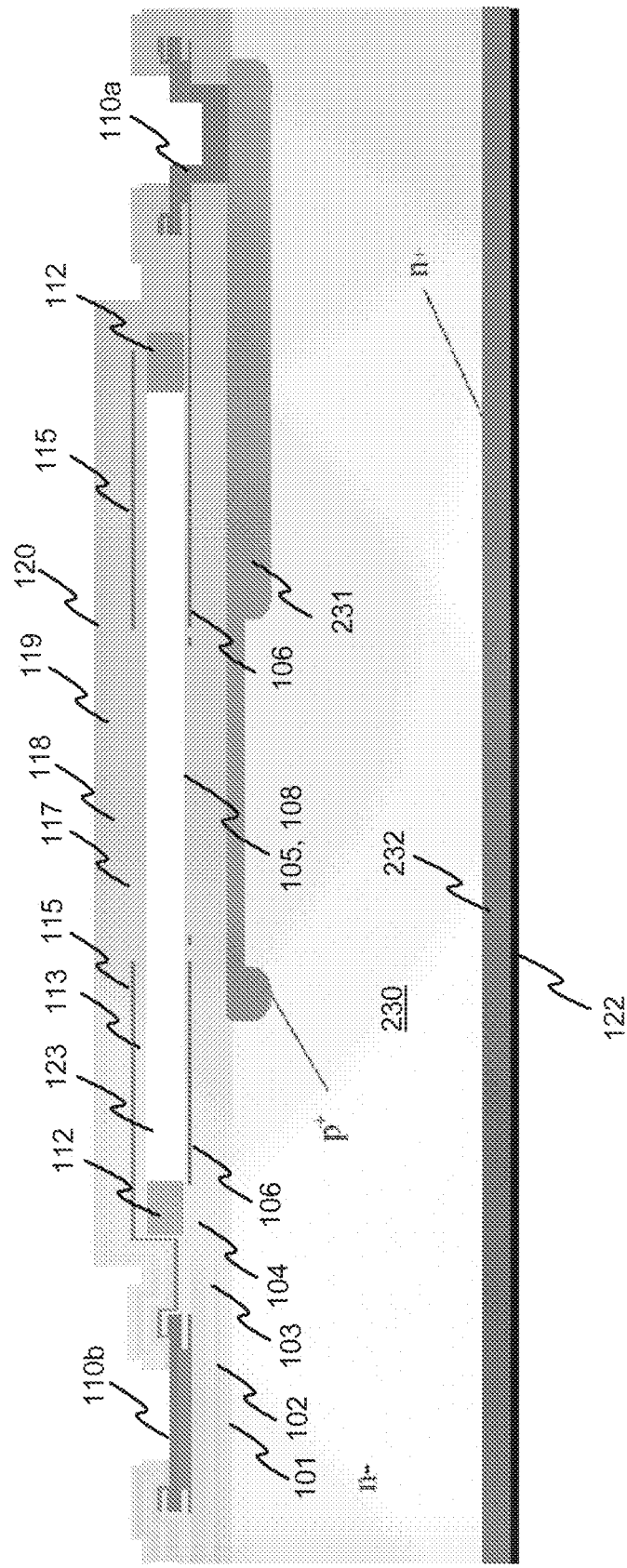
FIG. 2 illustrates a cross section of an exemplary monolithic integrated spectrometer according to the invention.

FIG. 2 illustrates a cross section of an exemplary monolithic integrated spectrometer according to the invention. The component has similar layers 101-122 as was described in connection with FIG. 1b. Thus the component has a functionality of a Fabry-Perot interferometer. The reflecting layers of the mirrors are provided by layers 103 and 118. The electrode 115 of the movable mirror is electrically connected to one of the electrical connections 110. The electrodes 106b of the lower, fixed mirror are electrically connected to another of the connections 110. The cavity of the interferometer is formed by the space 123, from which sacrificial polymer layer has been removed. The sacrificial layer is dry etched e.g. by burning with oxygen plasma through small holes of the second mirror structure, which will thus become movable. The polymer layer has been removed from the optical area of the interferometer wherein there are holes in the movable mirror. However, the polymer layer is not removed from the edges 112 of the polymer layer. The remaining polymer layer between the edges of the movable upper mirror and the lower fixed mirror serves as a support for the movable upper mirror. The polymer keeps the movable mirror in a straight and uniform position, and a suitable tension can be created and maintained for the movable mirror. It is thus preferable to use the polymer layer also as a support for the movable layer, but it is also a possible alternative to provide the support for the movable mirror by applying a supporting layer above and over the edges of the movable mirror. Such a support can be made of aluminium, for example.

The component of FIG. 2 also has a semiconductor detector of radiation, and the component thus gives an electric signal output which is a function of radiation intensity which is penetrated through the Fabry-Perot interferometer. The substrate is made of silicon in this embodiment, and the detector has been formed by applying a $p^+$ doped area 231, $n^-$ doped area 230, and $n^+$ doped area 232 in the silicon substrate as shown in FIG. 2. A detector of an integrated spectrometer may be formed as a pn-junction, PIN-detector or a charge-coupled device (CCD), for example. The pn-junction and PIN detector can be made of silicon, germanium, or indium gallium arsenide, for example.

Figure 3:
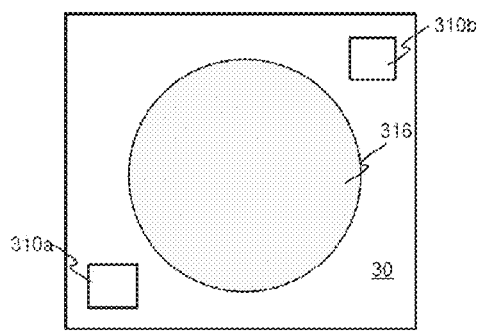
FIG. 3 illustrates a top view of an exemplary electrically tunable Fabry-Perot interferometer according to the invention.

FIG. 3 illustrates a top view of an exemplary electrically tunable Fabry-Perot interferometer 30 according to the invention. The contacts 310a and 310b for the electrodes of the upper and lower mirrors are located at corners of the interferometer. The optical area 316 is circular, and the upper, second mirror is provided with plurality of small-size holes. The holes are used for removing the sacrificial layer by etching with oxygen plasma. The holes are preferably evenly distributed across the optical area of the second mirror. The diameter of each hole may be e.g. 100 nm-5 µm. The holes may cover an area of 0.01%-5% of the optical area of the second mirror. Such holes function mainly as reflecting mirrors and do not therefore have substantial on the performance of the interferometer.

Figures 4A, 4B:
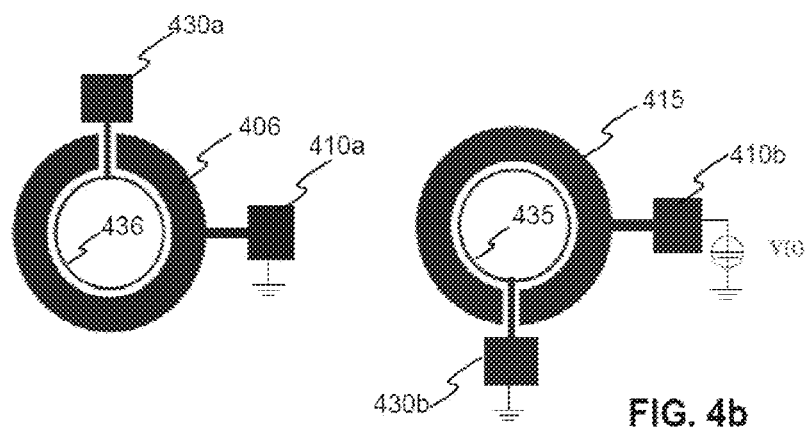
FIG. 4a illustrates an exemplary pattern of an electrode.
FIG. 4b illustrates an exemplary pattern of a counter electrode.

FIG. 4a illustrates an exemplary pattern of electrodes of a first part, and FIG. 4b illustrates an exemplary pattern of electrodes of a counter part. The electrodes of FIG. 4a can be e.g. electrodes of a fixed first mirror, and the electrodes of FIG. 4b can be e.g. the electrodes of the second, movable mirror, or vice versa.

The distance between the mirrors is controlled by applying a voltage between electrodes 406 and 415, which have electrical contacts 410a and 410b respectively. There is an additional centre electrode 435 at the counter part. This centre electrode is preferably connected to the same potential, such as ground, as the opposite control electrode. The electrode 435 determines the potential of the center part inside the electrode 435. In this way it is possible to avoid a potential difference between the centre parts of the mirrors. If potential difference would exist, this could cause an uneven offset into the position of the centre part of the movable mirror. There is possibly also an additional centre electrode 436 in the part of FIG. 4a. It is possible to use this electrode for a capacitive measurement of the distance between the mirrors. If the electrode 436 exists, it is preferable to connect both electrodes 435 and 436 in such a way that these electrodes have the same dc (direct current) potential, such as zero potential/ground potential. These electrodes determine the dc potential of the optical mirrors, and when the potential is the same in both mirrors the mirrors are kept in even level.

Figure 5A:
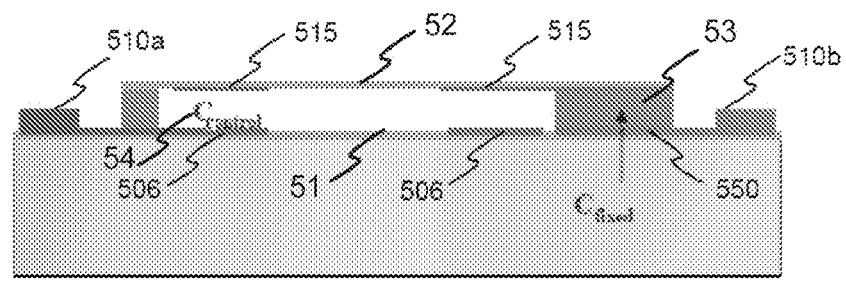
FIG. 5a illustrates an exemplary electrode structure where the electrode of the movable mirror is electrically floating.
Figure 5B:
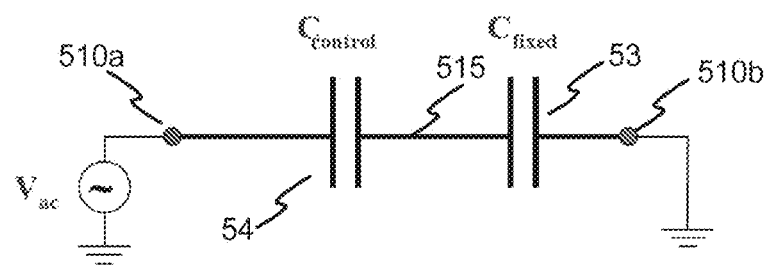

FIG. 5a illustrates an exemplary structure of electrodes where the electrode of one of the mirrors is electrically floating. FIG. 5b illustrates the equivalent circuit of the structure of FIG. 5a. In this structure it is not necessary to apply electrical connections to one of the mirrors, and therefore the production of the interferometer is less complicated, and the structure is more reliable. The floating electrode is controlled with alternating (AC) control signal.

The control voltage is applied between contacts 510a and 510b. The control signal is lead from the contact 510b via the conductor 550 and a fixed capacitance $C_{fixed}$, 53 to the electrode 515 of the upper mirror 52. The second contact 510a is lead to the electrode 506 of the lower mirror 51. The circuit therefore includes two capacitances connected in series: fixed capacitance $C_{fixed}$, 53, and control capacitance $C_{control}$, 54. The voltage between the electrodes 506 and 515 determines the distance between the mirrors 51 and 52. This voltage can be controlled by controlling the amplitude $V_{ac}$ of the AC signal applied between the contacts 510a and 510b.

In FIG. 5a the electrode of the upper, movable mirror is floating. It is also possible to provide an arrangement where an electrode of the lower, fixed mirror is floating. In this case the control voltage is connected to two electrodes of the upper, movable mirror. An electrode structure where one of the electrodes is electrically floating can also be applied in other types of micromechanical components. For example, it can be applied in electrically tunable Fabry-Perot interferometers which have been produced with other technology where, for example, other material than polymer is used as a sacrificial layer. The floating electrode structure can also be applied in other components than interferometers, such as in adjustable micromechanical capacitors.

The invention has been described with the reference to the enclosed embodiments. It is, however, clear that the invention is not restricted only to those, but it comprises all embodiments which can be imagined within the inventive idea and the enclosed patent claims.

For example, some materials, dimensions and forms have been mentioned as examples for implementation of the invention. However, it is clear that dimensions, forms and materials as well as details of structure or phases of production can be changed and optimised for each implementation according to the specific requirements.

Above, the use of aluminium was described as a conductive material forming electrodes, electrical wiring and connections. However, it must be noted that it is quite possible to use other alternatives of conductive materials, such as copper, gold or platinum. Also, silica and silicon has been mentioned as exemplary preferable materials for the substrate. However, it is naturally possible to use other alternative materials.

In the above embodiment $Al_2O_3$ and $TiO_2$ layers were used as optical layers of the mirrors. However, it is also possible to use several other alternative materials. For example, tantalum oxide or silicon nitride can be used instead of $TiO_2$, and silicon oxide can be used instead of $Al_2O_3$. It is required that the materials of the successive layers have sufficiently high difference in their values of refractive index.

It is useful that optical layers of the mirror structures are produced by atomic layer deposition, and electrodes of the mirror structures are formed by sputtering or evaporation. However, it is naturally possible that other alternative processes are used. For example, it is also possible that sputtering or chemical vapour deposition, CVD, is used for producing the optical layers.

The inventive interferometers have several preferable applications. They can be used as controllable filters in optical spectrometers, colour analyzers, imagers, optical data communications, and in various devices for measuring e.g. contents of specific gases or liquids.

The invention claimed is:

1. A method for producing an electrically tunable Fabry-Perot interferometer, the method comprising:
   producing the electrically tunable Fabry-Perot interferometer by
      providing a substrate,
      providing a first mirror structure on the substrate,
      forming a layer of sacrificial polymer over the first mirror structure,
      providing a second, movable mirror structure directly on the layer of sacrificial polymer to form a planar structure by depositing a uniform semi-insulating protective layer on the sacrificial polymer, the first and second mirror structures comprising a first mirror and a second mirror which are substantially parallel,
      providing a plurality of electrodes to control a distance between the first and second mirrors, the plurality of electrodes including a first fixed electrode and a second fixed electrode of one of the first and second mirrors, and an electrically floating electrode of another of the first and second mirrors, the electrically floating electrode of the other of the first and second mirrors being patterned on the uniform semi-insulating protective layer, the first and second fixed electrodes being electrically connected to a respective first contact and a second contact, the first fixed electrode and the floating electrode forming a changing capacitance, the floating electrode and the second fixed electrode forming a fixed capacitance, the fixed capacitance and the changing capacitance being connected in series, the first fixed electrode and the second fixed electrode being configured to have a voltage applied therebetween such that the distance between the first mirror and the second mirror is controlled; and
   providing a Fabry-Perot cavity between the first mirror and the second mirror by leaving some of the sacrificial polymer layer on edges of the cavity and removing at least a part of remaining portions of the sacrificial polymer layer after patterning the electrically floating electrode of the other mirror on the uniform self-insulating protective layer.

2. The method according to claim 1, wherein providing the second, movable mirror structure comprises providing at least one layer by a process in which a temperature of the sacrificial layer remains below the glass transition temperature of the polymer.

3. The method according to claim 1, wherein the substrate is a semiconductor wafer on which a plurality of interferometer chips are formed, the interferometer chips being cut out from the semiconductor wafer.

4. The method according to claim 3, wherein at least a part of the sacrificial layer is removed after the interferometer chips have been cut out from the semiconductor wafer.

5. The method according to claim 3, wherein the interferometer chips are encapsulated, and the at least part of the sacrificial layer is removed after the encapsulation of the interferometer chips.

6. The method according to claim 1, wherein a plurality of through-holes is provided in the second, movable mirror structure, and the at least part of the sacrificial layer of polymer is removed via the through-holes.

7. The method according to claim 1, wherein the at least part of the sacrificial layer is removed by dry etching.

8. The method according to claim 7, wherein the at least part of the sacrificial layer is removed by applying oxygen plasma.

9. The method according to claim 1, wherein providing the second, movable mirror structure comprises providing at least one optical layer by using atomic layer deposition.

10. The method according to claim 1, wherein providing the electrodes comprises sputtering or evaporating a thin film of electrically conductive material.

11. The method according to claim 1, further comprising providing an electrically insulating or semi-insulating layer on the surface of the floating electrode, between the electrode layer and the Fabry-Perot cavity, to protect the floating electrode.

12. The method according to claim 1, further comprising providing an electrically semi-insulating layer in the optical area of the first and/or second mirror to prevent an occurrence of charging.

13. The method according to claim 1, further comprising integrating a radiation detector on the substrate with the interferometer for measurement of radiation which penetrates through the interferometer.

14. A method of using an electrically tunable Fabry-Perot interferometer, the method comprising:
   producing the electrically tunable Fabry-Perot interferometer by
      providing a substrate,
      providing a first mirror structure on the substrate,
      forming a layer of sacrificial polymer over the first mirror structure,
      providing a second, movable mirror structure directly on the layer of sacrificial polymer to form a planar structure by depositing a uniform semi-insulating protective layer on the sacrificial polymer, the first and second mirror structures comprising a first mirror and a second mirror which are substantially parallel, providing a plurality of electrodes to control a distance between the first and second mirrors, the plurality of electrodes including a first fixed electrode and a second fixed electrode of one of the first and second mirrors, and an electrically floating electrode of another of the first and second mirrors, the electrically floating electrode of the other of the first and second mirrors being patterned on the uniform semi-insulating protective layer, the first and second fixed electrodes being electrically connected to a respective first contact and a second contact, the first fixed electrode and the floating electrode forming a changing capacitance, the floating electrode and the second fixed electrode forming a fixed capacitance, the fixed capacitance and the changing capacitance being connected in series, the first fixed electrode and the second fixed electrode being configured to have a voltage applied therebetween such that the distance between the first mirror and the second mirror is controlled; and providing a Fabry-Perot cavity between the first mirror and the second mirror by leaving some of the sacrificial polymer layer on edges of the cavity and removing at least a part of remaining portions of the sacrificial polymer layer after patterning the electrically floating electrode of the other mirror on the uniform self-insulating protective layer; and receiving an AC voltage as a control voltage and applying the control voltage between the first contact and the second contact, the control voltage being applied between the first fixed electrode and the second fixed electrode across the fixed and changing capacitances, the control voltage being led from one of the first and second contacts via the second fixed electrode and the fixed capacitance to the electrically floating electrode to control the distance between the first mirror and the second mirror.

* * * * *